D. T. PHILLIPS.
DERRICK.
APPLICATION FILED JUNE 13, 1912.
1,143,314.
Patented June 15, 1915.
2 SHEETS—SHEET 1.
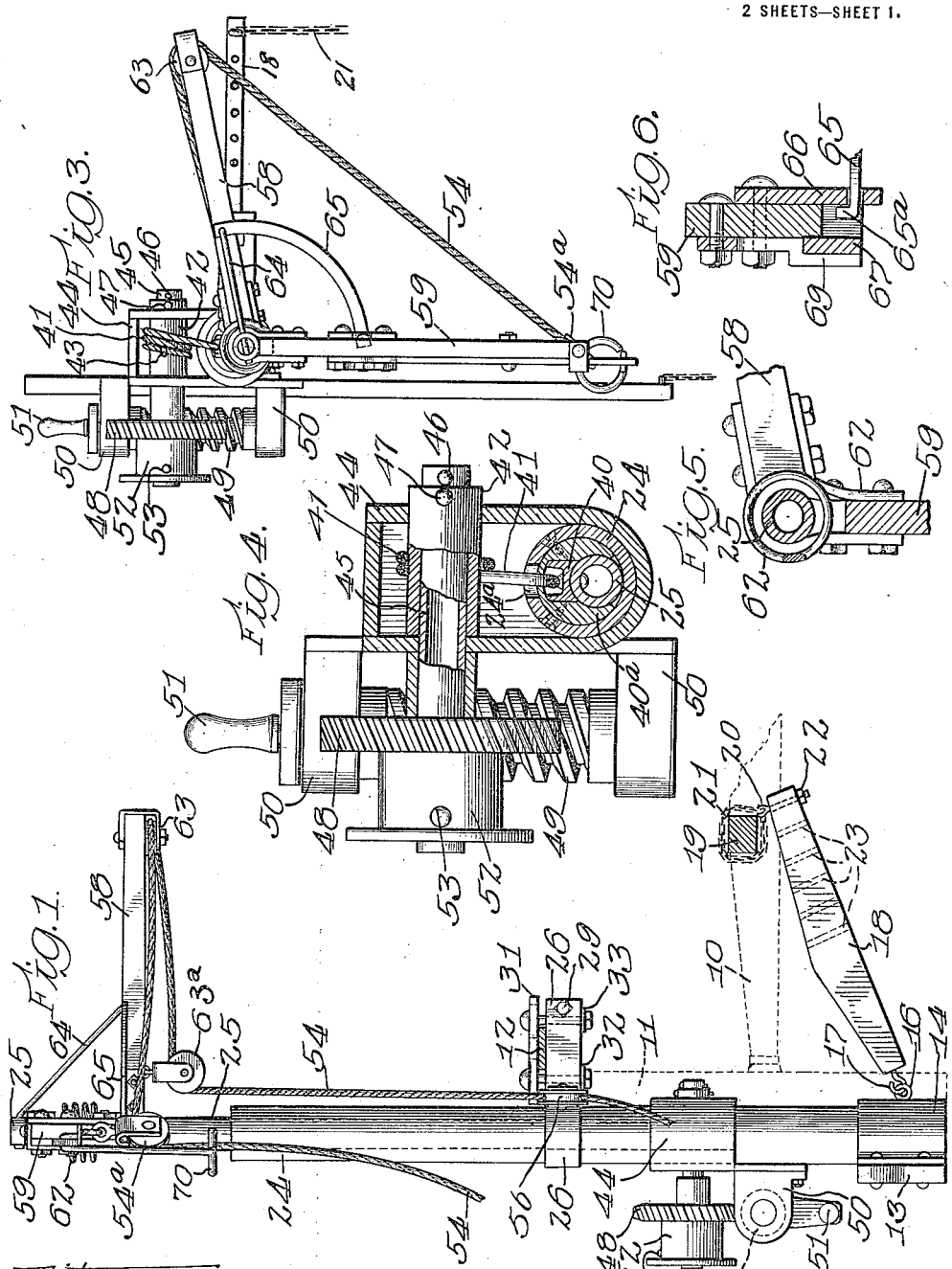

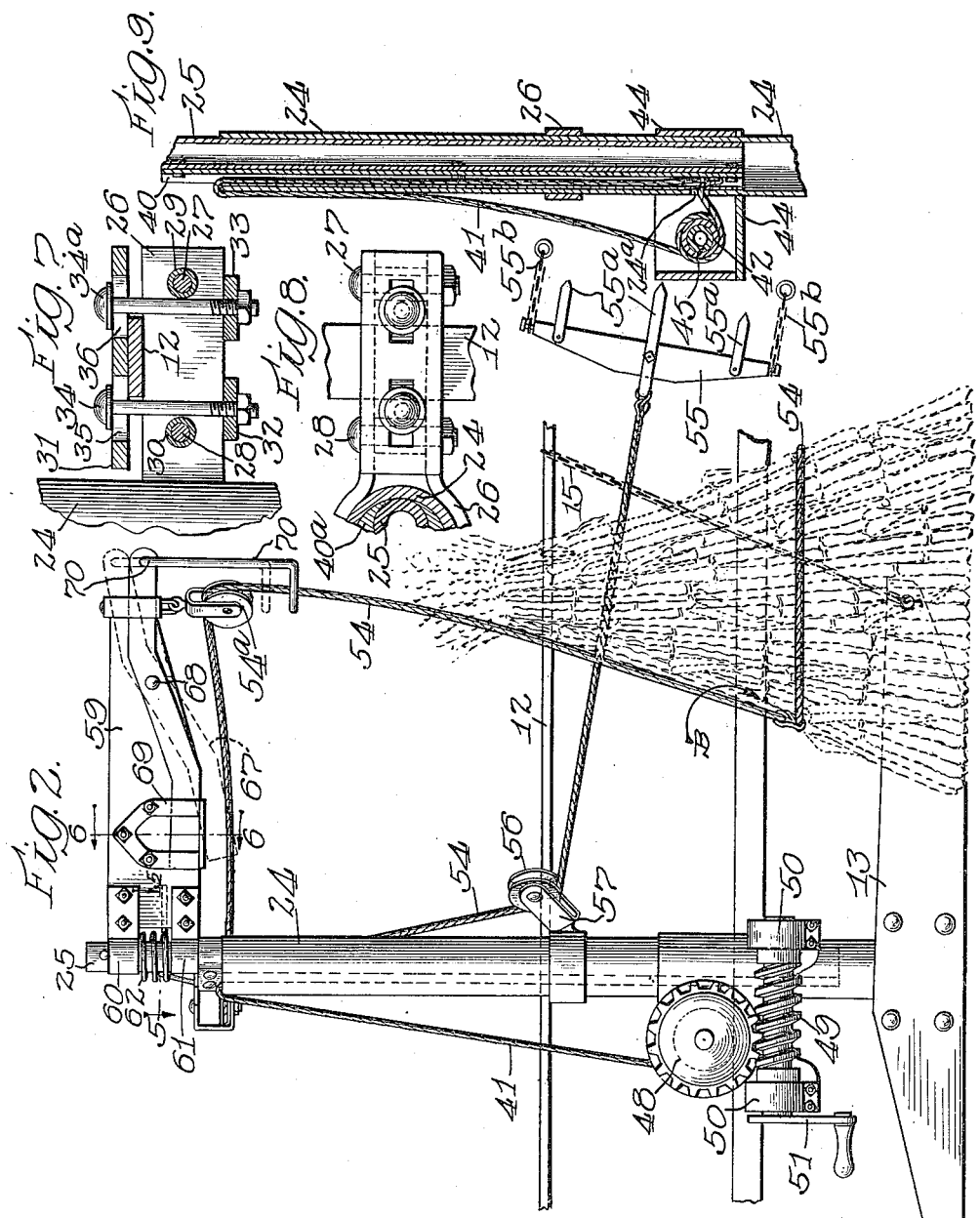

UNITED STATES PATENT OFFICE.

DARIUS T. PHILLIPS, OF CHICAGO, ILLINOIS.

DERRICK.

1,143,314. Specification of Letters Patent. Patented June 15, 1915.

Application filed June 13, 1912. Serial No. 703,384.

*To all whom it may concern:*

Be it known that I, DARIUS T. PHILLIPS, a citizen of the United States, residing at Chicago, in the county of Cook and State of Illinois, have invented certain new and useful Improvements in Derricks, of which the following is a specification.

My invention relates to improvements in transportable derricks of the type which may be attached to a wagon and drawn therewith across a field to operate as a convenient means for facilitating the loading of heavy materials, such as corn shocks or shocks of grain or hay, and the like, into a wagon or onto any other suitable support or conveyance.

It is among the chief objects of the invention to provide an improved derrick for farm use that is light and convenient for transportation and handling and easily attached to a wagon or other conveyance for the purpose of loading or shifting the relative positions of various farm products, such as grain, corn, hay or other vegetable or animal products.

Another important feature of my invention is in the arrangement of the flexible member or rope used for hoisting the objects desired to be handled by the derrick, and in the provision of an improved form of single tree designed to be secured to the forward end of the flexible member, the material or objects to be handled being secured at the other end of the flexible member, the design of the single tree being such as to adapt it for the purpose of overturning or loosening shocks of corn in particular prior to elevating them. This is an important feature in handling shock corn, particularly when the shocks have stood in the field for some time, as during the winter months, and the arrangement of my device is found to be complete and makes it unnecessary to use any special tools in loosening shocks from the ground prior to loading.

A further object of the invention is to provide improved construction by which the yard or mast arm of the derrick may be adjusted as to height without varying the angle of its horizontal position in relation to the main support.

A still further object of the invention is to provide an improved means for pivotally supporting the derrick mast arm by which the same is automatically returned to its former position after shifting a load.

Other objects of the invention are to be found in the special arrangements of parts hereinafter more fully described, shown in the accompanying drawings and set forth in the appended claims.

It is also an object of the present invention to provide an improved method of attacking and handling corn shocks for the purpose of loading them by proper means, such as derricks of the class described.

In said drawings Figure 1 is a side view of the complete derrick looking at it from the front of the wagon to the side on which it is attached, parts of the wagon and rack thereon being in section; Fig. 2 is a side view of the device in elevation looking at it broadside of the wagon to the side of the rack on which the device is attached, parts of the wagon and wagon rack being broken away. In this view the device is shown in position to begin the work of elevating a shock of corn fodder from the ground onto the wagon rack. In this view the drafting means for operating the derrick is shown in detail. Fig. 3 is a top plan view of the device of Figs. 1 and 2. Fig. 4 is a view of the windlass and windlass operating means, together with parts of the main supporting mast of the derrick which is shown in section. Fig. 5 is a detail view on line 5—5 of Fig. 2, partly in section, showing the details of the parts near the top of the main supporting mast of the derrick. This view is on a section line through the spring controlling the position of the yard arm of the derrick. Fig. 6 is a sectional view on line 6—6 of Fig. 2, showing the details of the means for releasing the yard arm to permit it to swing on the mast of the derrick to permit the arm to discharge its load. Fig. 7 is a detail view showing the manner of fastening the derrick mast to the wagon rack, parts of the device and parts of the rack being shown in section. Fig. 8 is a top plan view of the parts shown in Fig. 7, with parts of the derrick mast in section. Fig. 9 is a vertical sectional view taken longitudinally of the main supporting mast of the derrick, the view including a sectional representation of parts adjacent to the windlass.

In using a device of this character an ordinary farm wagon provided with a suitable rack or box for carrying corn fodder may be employed, and the derrick is fastened to the same in the manner illustrated in Figs. 1 and 2, one of the wagon axles being indicated by the reference character 10, the wagon wheel at 11, and one of the side boards of the rack at 12, this part being in section in Fig. 1. The derrick is carried by a suitable runner or shoe 13, to which is secured a socket 14, adapted to receive the lower extremity of the mast of the derrick. The forward extremity of the runner 13 is preferably beveled as illustrated in Fig. 2 in the usual form of a sled runner, and provision as indicated may be made for the attachment to this runner of a flexible member as indicated at 15, a chain being preferably used for this purpose. The chain may be secured in any desired manner to the rack 12 or other suitable part of the wagon. Another attachment of the runner 13 to the wagon is desirable to govern the sidewise movement of the same, and for this purpose I prefer to provide the socket 14 with an eye bolt 16, adapted to take a single eye bolt or hook 17, secured to one end of a suitable bar of wood or metal 18. The bar 18 is preferably of such a length that its other end extends adjacent some portion of the reach or hounds, as indicated at 19, of the wagon. This end of the bar 18 is preferably provided with an eye bolt 20, to which a suitable chain 21 is secured for the purpose of attaching the supporting bar 18 to some fixed part of the wagon. The eye bolt 20 is preferably screw threaded at the end opposite the eye, and is adapted to take a nut, as indicated at 22, to secure the same in one of the holes provided in the bar 18. I prefer to provide a number of holes in the bar 18 at suitably spaced distances, as indicated at 23, by which the eye bolt and the flexible fastening means 21 secured thereto may be directed to accommodate the bar for attachment to different sizes of wagons or different parts of the same wagon, according to the desire of the user.

The mast of my derrick is constructed of a number of telescoping parts in order to secure adjustability or variation in the height of the yard arm of the derrick. In the embodiment of the invention illustrated the mast is shown as being formed by a metallic tubular member 24, the lower extremity of which is seated in the socket 14 of the supporting runner 13, and which may extend to any desired height, being shown as of approximately double the height of the wagon rack. This tubular member 24 being hollow will permit the telescoping on the interior thereof of the upper and smaller section of the mast, which is indicated by the reference character 25, and consists of a metallic member circular in cross section on its exterior. This is preferably hollow or tubular in form, although it will be apparent that it may be of solid material if desired. The bottom or relatively stationary portion of the mast 24 is secured by suitable clamping means to the rack of the wagon, one of the side boards of which is shown in the drawings and indicated by the reference character 12. Clamping means for this purpose is provided, and the same is shown in detail in Figs. 7 and 8. This clamping means is preferably adjustable longitudinally of the tubular portion 24 of the mast, and may be conveniently constructed as illustrated by extending a large piece of strap metal in form illustrated in Figs. 1, 7 and 8, so that a portion of it will encircle loosely the tubular member 24 and the extremities of the same extend parallel from the circumferential portion of the tubular member 24 a considerable distance. This part is indicated by the reference character 26, and each projecting portion is provided with two or more registering holes through which suitable clamping bolts, as indicated at 27, 28, may be passed.

For the purpose of rendering the clamping means more firm, it is preferred that the bolts 27, 28 have suitable sleeves or spacing devices 29, 30, in position over then between the parallel extremities of the member 26. By loosening the bolts 27, 28 it will be apparent that the clamping means may be adjusted longitudinally of the large portion 24 of the mast to adapt the device for attachment to the racks or boxes of wagons of various heights. Top and bottom plates are provided as indicated at 31, 32 and 33. The bottom plates 32, 33 serve merely as seats or supports for the retaining bolts, and the threaded nuts thereon. The upper member 31, however, is provided with slotted openings as indicated at 35, 36 to permit of adjustment of the parts to fit rack boards of varying widths. It will be apparent that the tightening of nuts on bolts 27, 28 will cause the clamping member 26 to surround tubular mast 24 and support the derrick in an upright position. The large tubular portion 24 of the mast has telescoped on the interior thereof the smaller mast portion 25 already referred to, and the diameter of this last mentioned part is preferably about half the interior of the tubular member 24. In order that the upper section 25 may be properly supported on the interior of the tubular member 24, I prefer to secure a channeled member, as indicated at 40 to the member 25, the same being shown in section in Figs. 4 and 9. The channel member and the small tubular mast 25 may be secured together by riveting as shown, or by other suitable means. In the channel of member 40 is a rope of some strong suitable flexible material, as indicated by reference character 41. This is for the adjustment of the small telescoping mast 25 in relation to the lower section 24, the relation of these parts being shown in the vertical sectional view of Fig. 9. The rope 41 preferably has its ends both secured near the bottom of the channel member 40 and within the groove or channel of this member. One strand of the flexible member 41 is preferably allowed to pass outwardly through the large tubular section 24 of the mast to a windlass or winding roller 42, to which the flexible member is secured. The other free end of the flexible member 41 may be also secured near the bottom of the channel member 40, as stated, and be extended thence upwardly lying within the groove of the channeled member and passing outwardly over the top of the large section 24 of the mast, thence downwardly also to the windlass 42.

It will be seen that the small tubular portion of the mast 25 and the channel member 40 secured thereto do not entirely fill the interior opening of the tubular mast member 24, and in order to furnish a bearing or support in the interior of the tubular member 24 of the mast it is preferred that a number of sliding supports or guides, as indicated in elevation in Fig. 4, by the reference character 40ª be provided. There may be two or more of such guides, and they may be secured to the tubular main mast 24 by screws as indicated, thus preventing any turn of the telescoping sections of the mast. An opening 24ª through the wall of the mast section 24 is provided for the extension of the flexible mast controlling cable 41 adjacent the windlass. It is preferred that the flexible member 41 be coiled a number of times around the windlass 42, and then firmly secured thereto, as by a suitable staple or clamp, as indicated at 43, Fig. 3. As a support and protection for the windlass 42, a suitable housing 44 is provided, the same being secured to the large tubular mast member 24, and the windlass roller 42 is rotatably mounted within this housing upon a shaft 45. The shaft 45 may be provided with a pin 46 for preventing longitudinal movement of the windlass roller 42 thereon, and in order to permit relative movement between the windlass roller and its operating shaft 45, it is preferred that there be registering holes in the tubular roller 42 and the shaft by which they may at certain times be locked together by the use of suitable means, as pin 47 shown in Fig. 3. The shaft 45 may be either a tubular shaft, as shown in Fig. 4, or it may be solid, if desired. It preferably carries on a portion thereof, extended beyond the housing 44, a toothed wheel 48, adapted to be engaged by a worm 49, journaled in a frame 50, secured to the housing 44, and the large tubular portion 24 of the derrick mast. The worm 49 is preferably actuated by crank 51 within convenient reach of an operator. This crank 51 and the worm driven gear wheel are preferably of strong and generous proportions, so that they may serve also to operate the roller of the windlass, not only as described, for the purpose of relatively adjusting the telescoping parts of the main mast, but for the purpose of lifting the load as well, if it is not desired nor convenient to use draft power, such as horses, in lifting the load. To accomplish this purpose the gear wheel 48 or the shaft 45 to which it is secured is provided with the flanged roller 52 adapted to have secured thereto by a pin 53 the main flexible cable 54 for lifting the load of the derrick.

In the embodiment of the invention illustrated, the main operating cable or rope 54 is shown provided at its draft end with a swingle tree 55 of special design hereinafter more fully described, to which a draft animal may be attached or hitched, but if it is not desired nor convenient to use draft animals, it will be obvious that the cable or rope 54 will be detached from the swingle tree 55 and secured to the pin 53 on windlass roller 52. As a guide for the main operating cable 54 a sheave 56 is loosely mounted or swiveled as indicated at 57 on the large tubular portion 24 of the mast. The smaller adjustable or telescoping portion 25 of the mast is provided near its upper extremity with two horizontally extending yard arms or mast arms, which coöperate in supporting the load bearing cable 54. These arms are indicated by the reference characters 58 and 59 respectively, the former being rigidly secured to the telescoping member 25 of the mast near the upper extremity thereof, and the latter also secured to the same part just above the arm 58 by a loose pivotal connection permitting it to swing horizontally through an angle of approximately 120°.

The construction of the swinging arm 59 is shown somewhat in detail in Figs. 2 and 3, from which it will be seen that its hinging connection with the shaft 25 is secured by means of loops or straps 60, 61 encircling the mast 25, and being secured to the arm 59 by bolts or other suitable means, as illustrated. In order to hold the arm 59 in its normal or load receiving position, which is preferably about 120° from the fixed arm 58, the torsion spring 62 is provided, the same preferably being coiled about telescoping mast section 25, with one end secured to this part and the other bearing against some portion of the arm 59 to operate it. When the pivoted arm 59 therefore is swung in the direction of the fixed arm 58, this movement will be resisted by the torsion spring 62, and the effect of the spring will be to return the arm 59 to its normal position remote from the fixed arm 58 in position to receive a new load. No special construction of the fixed arm 58 is necessary, but it is preferred that it be provided with two sheaves, as indicated at 63, 63ª, the former being supported near the outer extremity of the arm and the other swivelly connected to the same near its point of attachment with the mast of the derrick. It is desired, however, that the arm 58 be rigidly secured to the telescoping portion 25 of the mast, and to accomplish this purpose a brace, as indicated at 64, may extend diagonally from a portion of the arm remote from its connection with the mast to an extended upper part of the mast 25.

A guiding and locking segment 65 in the general form of the segment of a circle is secured at one extremity to the arm 58, preferably near the fastening of the brace 64 therewith, for the purpose of strengthening the parts, and this guiding segment extends to a point adjacent the normal loading position of the swinging mast arm 59. At its forward extremity it is provided with an upturned portion, indicated by the reference character 65ª, Fig. 6. A suitable slotted guide 66 is secured to the swinging mast arm 59, with a guide slot therein which will permit relative movement of the arm 59 in relation to the fixed mast arm 58, but the upturned part 65ª, it will be seen, will act to check movement of the swinging arm 59 away from the arm 58 in the arc of a circle greater than the length of segment 65. Means is also provided on arm 59 to lock the swinging arm 59 in fixed relation to the fixed arm 58, and this consists of a lever 67 pivotally secured to arm 59 at 68. One end of the lever 67 is adapted normally to present its flat side in the path of the upturned end 65ª of the segment 65. This lever 67 is supported by a suitable guide member 69, which may be branched as illustrated in Fig. 2, so that it will extend on both sides of the path of the upturned end 65ª of the segment. The forward free end of the lever 67 is provided with a depending link 70, the lower extremity of which is adapted to hang within the path of a load, being elevated by the load carrying end of the cable 54, in order that a load being elevated by the cable 54 will strike the link 70 and operate lever 67 to the position shown in Fig. 2 in dotted lines. This will cause the end of the lever 67 to pass below the path of the upturned end of the segment, which will unlock the mast arm 59 and permit the load to be swung against the resistance of torsion spring 62 to any desired position in the direction of the fixed arm 58. It will be seen that the relative arrangement of the sheaves supporting the load carrying cable is such that when the parts are unlocked as described the continued application of power on the cable causes the mast arm 59 to swing in the direction of and into a position adjacent to the fixed arm 58. When the pull on the cable is stopped, the load will descend. If a draft animal is being used, the animal will soon learn to release the load, and if the power applying end of the lifting cable be attached to the windlass, the operator will readily complete the discharging of the load by releasing the windlass.

One of the important features of the invention is the provision made for using my improved derrick in handling shocks of corn fodder, particularly after the same have stood for such a length of time as to become settled in the ground, with the lower extremities of the shock difficult to release from the ground because of freezing or otherwise. I find it desirable to provide means for first tearing such shocks loose from the ground before attempting to elevate them, and to do this the lifting cable should first be firmly attached to the shock. This is illustrated in Fig. 2, with the swingle tree to which the draft animal is to be secured in a position for hitching the animal to the lifting cable. If the shock be in a condition for ready detachment from the ground, the position of the parts of the machine as illustrated in relation to the shock will be sufficient, and when the animal begins to pull on the swingle tree 55, the effect will be to lift the shock bodily from the ground, and after it contacts with the link 70 it will be seen that the swinging mast arm 59 will be released in the manner described, and the continued application of power will cause the mast arm 59 to swing, carrying the shock with it until the mast arm 59 approaches the position of the fixed arm 58, when the shock may be discharged. If conditions, however, be such that it is desired to utilize my arrangement of the parts for tearing the shock loose before elevating it, when the lifting cable 54 is secured around the shock in the manner illustrated in Fig. 2, the swingle tree 55 should be passed between the descending branch of the cable 54 and the shock at the point just a few inches above that portion of the cable 54 encircling the shock. This part of the shock is indicated by the line designated by the reference character B, Fig. 2. It will be seen that the swingle tree 55 is provided with a plurality of projecting members 55ª, more or less pointed and adapted to pierce the material within the shock. In order to make use of this swingle tree for the purpose of detaching the shock or tearing it loose from the ground, it is desired that the tugs on the harness of the horses be of somewhat more than the usual length, as the horse should be hitched on the side of the shock opposite the part indicated by the reference character B with the tugs extending on either side of the shock to the ends of the swingle tree 55. To assist in obtaining this result without undue lengthening of the tugs of the harness, I prefer to provide the ends of the swingle tree 55 with short tug chains, to which the tugs of the harness may be hitched, the same being indicated by the reference character 55ᵇ, Fig. 2.

To an extent the preferred method of operating the device has been touched upon in the preceding description, but it should be noted that in the preferred form of the device as illustrated the derrick will depend upon the rigidity of some form of vehicle for its support, and when so attached it will be drawn through the field upon its supporting runner 13, with the attaching means described, from one shock to another, or from one object to another desired to be loaded upon the vehicle, the runner 13 being given the form of a sled runner for this purpose. The device is arranged so that the work of elevating or loading may be accomplished by the hand of the operator or by a draft animal, and in loading corn shocks the main lifting cable 54 will probably be relatively somewhat longer than illustrated in Fig. 2, so that at the instant of the connection of the draft animal with the shock, when it is desired to use the power of the draft animal in loosening or upsetting the shock, there may be more slack in the cable than illustrated in the arrangement of the parts in Fig. 2. In the practical operation of the device in the field it is found that it is convenient to so arrange the derrick and the draft animal in relation to the vehicle being loaded that the draft animal elevating the load shall move in the direction away from the vehicle being loaded in elevating the shock and toward the next and succeeding shock to be loaded. In this manner when the draft animal shall have gone forward a sufficient distance to elevate the shock from the ground and swing it in the arc of a circle over the end or rack of the vehicle, it will have progressed a sufficient distance forward to be in the probable vicinity of the next shock to be loaded, so that the operator after the shock is upon the wagon will find it necessary only to drive to the next shock, which the person operating the draft animal will have reached some time in advance of the wagon and derrick, and the person in charge of the draft animal may have the swingle tree 55 secured to the draft rope 54 and the animal in position to overturn the shock by the time the operator of the wagon and derrick reaches the side of the next shock, when it will only be necessary to secure the other free end of the elevating cable 54 around the shock, after which the loading of the new shock may continue as already described, and this operation repeated indefinitely until the wagon is completely loaded.

In order that the invention may be fully understood, the details of the preferred embodiment thereof have been illustrated as specifically described, but it is not desired to be limited to the exact details, for it will be apparent that a person skilled in this art may resort to many modifications of the invention without departing from the purpose and spirit thereof.

What I claim is:

1. In a loader of the class described, the combination of a mast relatively fixed in relation to its supporting means, and having a laterally extending arm fixed in relation thereto, a laterally extending arm pivotally connected to the mast and normally occupying an angular position with relation to said fixed arm, means for swinging the movable load carrying arm toward the fixed arm on the mast for the purpose of shifting the load, and means for automatically restoring said load carrying arm to normal position, comprising elastic means adapted to shift the movable arm radially in a direction from the fixed arm.

2. In a loader of the class described, the combination of a mast relatively fixed in relation to its supporting means and having a laterally extending arm fixed in relation thereto, a swingable load carrying arm pivotally connected to the mast and normally occupying an angular relative position in relation to said fixed arm, a single load shifting cable extending from the load to the fixed and swingable arms and adapted to raise the load, means for supporting the cable in relation to the said fixed and swingable arms comprising sheaves secured to the said fixed laterally extending arm, and a sheave on the movable arm, and locking mechanism for holding the swingable arm in normal relation to the fixed arm and the mast until the load reaches a certain elevation.

3. In a loader of the class described, the combination of a mast relatively fixed in relation to its supporting means and having a laterally extending arm fixed in relation thereto, a movable load carrying arm pivotally connected to the mast, a load shifting cable, means for supporting the cable in relation to the mast and the said fixed and movable arms, comprising sheaves secured to the mast and to the said fixed laterally extending arm, and a sheave on the movable arm, and locking mechanism for controlling the relation of the movable load carrying arm to the fixed arm on the mast for the purpose of shifting the load, said mechanism comprising means for positively controlling the relation between the movable arm and the fixed arm, and means operable upon the release of said locking mechanism for automatically swinging said movable arm in relation to the fixed arm.

4. In a loader of the class described, the combination of a mast relatively fixed in relation to its supporting means and having a laterally extending arm fixed in relation thereto, a movable load carrying arm pivotally connected to the mast and normally positioned at an angle to said fixed arm, sheaves on said fixed and movable arms, a single load cable extending from the load and over said sheaves, locking mechanism normally holding said arms in their relative angular position, means controlled by the height of the load for releasing said locking mechanism and permitting said movable arm to swing the load toward said fixed arm, and means for automatically returning said movable arm to normal position.

5. In a loader of the class described, the combination of a mast relatively fixed in relation to its supporting means and having a laterally extending arm fixed in relation thereto, a movable load carrying arm pivotally connected to the mast, elastic means adapted to shift the movable arm radially in a direction away from the fixed arm, locking means for normally preventing the movement of said movable arm, means for supporting the load comprising a flexible cable operatively connected with the fixed and movable arms, sheaves on each of said arms for supporting said cable, and means for releasing said locking means, comprising a member connected to the locking means and extending into the path of the load and being adapted to be operated by contact with the load as it is shifted by the cable.

6. In a loader of the class described, the combination of a mast relatively fixed in relation to its supporting means and having a laterally extending arm fixed in relation thereto, a suitable load carrying arm pivotally connected to the mast to swing with relation to said fixed arm, a flexible load carrying cable supported on the mast and the said movable and fixed arms, means normally restraining the relative movement of the movable and fixed arms, means controlled by the height of the load for releasing the said restraining means to permit the movable arm to swing in relation to the fixed arm, means for automatically restoring said movable arm to its restrained position.

7. In a loader of the class described, the combination of a mast relatively fixed in relation to its supporting means and a fixed arm extending from the upper extremity of the mast, said mast comprising two telescoping members for varying the height of the arm, a pivoted load carrying arm carried by the mast adjacent the said fixed arm, a load carrying cable coöperating with the said movable and fixed arms, a locking device carried by said movable arm for normally holding it in definite relation to the fixed arm, and means under the control of the load for releasing the said locking means.

8. In a loader of the class described, the combination of a mast relatively fixed in relation to its supporting means and having a laterally extending arm fixed in relation thereto, a movable load carrying arm pivotally connected to the mast, elastic means tending to position the movable load carrying arm at an angular relation to the fixed arm and the mast, means for positively locking the load carrying arm in said angular relation to the fixed arm, and means operable by the height of the load for releasing the said locking means to permit the movable load carrying arm to be shifted against the tension of said elastic means.

9. In a loader of the class described, the combination of a mast relatively fixed in relation to its supporting means, and having a laterally extending arm fixed in relation thereto, a movable load carrying arm pivotally connected to the mast, a segment secured to the fixed arm and extending adjacent the movable load carrying arm, means for locking the movable load carrying arm to the segment to control its relation to the fixed arm, means adapted to be operated by the movement of the load to a predetermined height for releasing the locking means between the movable load carrying arm and segment, and a flexible load carrying member supported by sheaves on the fixed and movable arms.

10. In a loader of the class described, the combination of a mast relatively fixed in relation to its supporting means and having a laterally extending arm fixed in relation thereto, a movable load carrying arm pivotally connected to the mast, a segment secured to one of the arms and extending adjacent the other arm, means for locking the arm in relation to the segment, means under the control of the load for releasing the locking means to permit relative movement between the arms, and a flexible load carrying member supported by sheaves on the fixed and movable arms.

11. In a loader of the class described, the combination of a mast relatively fixed in relation to its supporting means and having a laterally extending arm fixed in relation thereto, a movable load carrying arm pivotally connected to the mast and means for controlling the relation of the movable load carrying arm to the fixed arm and the mast for the purpose of shifting the load, said means comprising a segment fixed to one of the arms and extending adjacent the other arm, there being means on the movable arm for engaging the segment to lock the movable arm in relation to the segment, and a flexible load carrying member supported by sheaves on the fixed and movable arms.

12. In a loader of the class described, the combination of a mast relatively fixed in relation to its supporting means and having a laterally extending arm fixed in relation thereto, a movable load carrying arm pivotally connected to the mast, means for controlling the relation of the movable load carrying arm to the fixed arm on the mast for the purpose of shifting the load, said means comprising a segment fixed to one of the arms and extending adjacent the other arm, there being means on the movable arm for engaging the segment to lock the movable arm in relation to the segment, means operable by the height of the load for releasing the movable arm to permit it to swing in relation to the fixed arm for the purpose of positioning the load, and a flexible load carrying member supported by sheaves on the fixed and movable arms.

13. In a loader of the class described, the combination of a mast relatively fixed in relation to its supporting means and having a laterally extending arm fixed in relation thereto, a single load carrying cable supported by said mast and arm for lifting the load, said cable being passed through a sheave on the mast, hitching means for a draft animal secured to the load carrying cable at the free end thereof adjacent said sheave and being adapted for overturning the shock, said means comprising a whiffle tree provided with protruding fingers for engaging the shock, and means on the other end of said cable for attachment to the shock to hold said shock while being overturned and for subsequently elevating the overturned shock by a continuation of the pulling on the cable by the draft animal attached to the whiffle tree.

In testimony whereof I have signed my name to this specification, in the presence of two subscribing witnesses, on this 11th day of June, A. D. 1912.

DARIUS T. PHILLIPS.

Witnesses:
A. L. SPRINKLE,
CHARLES H. SEEM.

Copies of this patent may be obtained for five cents each, by addressing the "Commissioner of Patents, Washington, D. C."